United States Patent
Amkraut et al.

(10) Patent No.: US 8,402,765 B2
(45) Date of Patent: Mar. 26, 2013

(54) TRANSLATING VARIABLE AREA FAN NOZZLE PROVIDING AN UPSTREAM BYPASS FLOW EXIT

(75) Inventors: Daniel M. Amkraut, San Diego, CA (US); Michael John Layland, Bonita, CA (US); Norman John James, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 1119 days.

(21) Appl. No.: 12/485,551

(22) Filed: Jun. 16, 2009

(65) Prior Publication Data

US 2010/0229527 A1 Sep. 16, 2010

Related U.S. Application Data

(63) Continuation-in-part of application No. PCT/US2008/072448, filed on Aug. 7, 2008.

(60) Provisional application No. 60/954,756, filed on Aug. 8, 2007.

(51) Int. Cl.
 *F02K 1/09* (2006.01)
 *F02K 3/075* (2006.01)
 *F02K 1/70* (2006.01)

(52) U.S. Cl. .......... 60/771; 60/226.3; 60/232; 60/226.2; 239/265.31

(58) Field of Classification Search .............. 60/226.2, 60/226.3, 232, 771; 239/265.27, 265.29, 239/265.31
See application file for complete search history.

(56) References Cited

U.S. PATENT DOCUMENTS

| | | | |
|---|---|---|---|
| 3,360,308 A | 12/1967 | Grabowski et al. | |
| 3,404,581 A | 10/1968 | Kraus | |
| 3,747,341 A | 7/1973 | Davis | |
| 3,779,010 A | 12/1973 | Chamay et al. | |
| 3,820,719 A | 6/1974 | Clark | |
| 4,375,276 A | 3/1983 | Konarski | |
| 4,407,120 A | 10/1983 | Timms | |
| 4,519,561 A | 5/1985 | Timms | |
| 4,922,713 A | 5/1990 | Barbarin | |
| 5,090,197 A | 2/1992 | Dubois | |
| 5,181,676 A | 1/1993 | Lair | |
| 5,228,641 A | 7/1993 | Remlaoui | |
| 5,297,387 A * | 3/1994 | Carimali et al. ............. | 60/226.2 |

(Continued)

FOREIGN PATENT DOCUMENTS

| | | |
|---|---|---|
| EP | 0109219 A2 | 5/1984 |
| EP | 0 315 524 A1 | 5/1989 |

(Continued)

OTHER PUBLICATIONS

European Search Report (EP 10005250), dated Jan. 25, 2012, 5 pgs.

(Continued)

*Primary Examiner* — Ted Kim
(74) *Attorney, Agent, or Firm* — Womble Carlyle Sandridge & Rice, LLP

(57) ABSTRACT

A variable area fan nozzle assembly for a turbofan engine includes a nacelle having an aft edge and a translating nozzle segment having a forward edge and a first end. The nozzle segment is movably disposed behind the aft edge such that an upstream bypass flow exit is defined between the aft edge and the forward edge when the nozzle segment is in a deployed position. A deflector is disposed between the aft edge and the forward edge proximate to the first end. The deflector substantially prevents bypass flow from exiting the upstream bypass flow exit in a region that is proximate to the first end.

5 Claims, 16 Drawing Sheets

U.S. PATENT DOCUMENTS

| | | | |
|---|---|---|---|
| 5,404,714 A | 4/1995 | Davies | |
| 5,547,130 A | 8/1996 | Davies | |
| 5,575,147 A | 11/1996 | Nikkanen | |
| 5,655,360 A | 8/1997 | Butler | |
| 5,778,659 A | 7/1998 | Duesler | |
| 5,806,302 A | 9/1998 | Cariola | |
| 5,833,140 A | 11/1998 | Loffredo | |
| 5,960,626 A | 10/1999 | Baudu et al. | |
| 5,996,937 A * | 12/1999 | Gonidec et al. | 239/265.19 |
| 6,079,201 A | 6/2000 | Jean | |
| 6,167,694 B1 | 1/2001 | Davies | |
| 6,170,254 B1 | 1/2001 | Cariola | |
| 6,318,070 B1 | 11/2001 | Rey et al. | |
| 6,474,059 B2 | 11/2002 | Stretton | |
| 6,584,763 B2 | 7/2003 | Lymons et al. | |
| 6,681,559 B2 | 1/2004 | Johnson | |
| 6,751,944 B2 | 6/2004 | Lair | |
| 6,845,945 B1 | 1/2005 | Smith | |
| 6,895,742 B2 | 5/2005 | Lair et al. | |
| 6,945,031 B2 | 9/2005 | Lair | |
| 6,966,175 B2 | 11/2005 | Lair | |
| 6,968,675 B2 | 11/2005 | Ramlaoui | |
| 6,971,229 B2 | 12/2005 | Lair | |
| 6,976,352 B2 | 12/2005 | Lair | |
| 7,007,454 B2 | 3/2006 | Dehu et al. | |
| 7,010,905 B2 | 3/2006 | Lair | |
| 7,093,793 B2 | 8/2006 | Lair | |
| 7,127,880 B2 | 10/2006 | Lair et al. | |
| 7,146,796 B2 | 12/2006 | Lair | |
| 7,174,828 B2 | 2/2007 | Davies | |
| 7,264,203 B2 | 9/2007 | Lair | |
| 7,818,958 B2 | 10/2010 | Bulin et al. | |
| 8,006,479 B2 | 8/2011 | Stern | |
| 8,104,261 B2 | 1/2012 | Marshall et al. | |
| 2004/0079073 A1 | 4/2004 | Ramlaoui et al. | |
| 2005/0188676 A1 | 9/2005 | Lair | |
| 2005/0204742 A1 | 9/2005 | Lair | |
| 2007/0294996 A1* | 12/2007 | Stephan et al. | 60/226.2 |
| 2008/0000235 A1 | 1/2008 | Hanson | |
| 2008/0001039 A1 | 1/2008 | Winter et al. | |
| 2008/0084130 A1 | 4/2008 | Darby | |
| 2008/0163606 A1 | 7/2008 | Cini et al. | |
| 2009/0053058 A1 | 2/2009 | Kohlenberg | |
| 2009/0288386 A1 | 11/2009 | Marshall et al. | |
| 2010/0031630 A1* | 2/2010 | Bulin et al. | 60/226.2 |
| 2010/0139242 A1 | 6/2010 | Vauchel et al. | |
| 2010/0192715 A1 | 8/2010 | Vauchel et al. | |
| 2010/0205931 A1 | 8/2010 | Baudu et al. | |
| 2010/0229528 A1 | 9/2010 | Ramlaoui et al. | |

FOREIGN PATENT DOCUMENTS

| | | |
|---|---|---|
| EP | 0 779 429 A2 | 6/1997 |
| EP | 1 052 427 A2 | 11/2000 |
| EP | 1878904 A2 | 1/2008 |
| EP | 2050948 A2 | 4/2009 |
| EP | 1978231 B1 | 2/2012 |
| FR | 2 866 020 A1 | 8/2005 |
| FR | 2917788 A1 | 6/2007 |
| FR | 2921976 A1 | 10/2007 |
| FR | 2922059 A1 | 10/2007 |
| FR | 2912189 * | 8/2008 |
| GB | 925010 A | 5/1963 |
| GB | 2285020 A | 6/1995 |
| WO | 02/103189 A1 | 12/2002 |
| WO | WO 2005/082771 A1 | 9/2005 |
| WO | 2008/045056 A1 | 4/2008 |
| WO | 2008045070 A1 | 4/2008 |
| WO | WO 2008/045034 A1 | 4/2008 |
| WO | WO 2008/045056 A1 | 4/2008 |
| WO | WO 2008/045062 A1 | 4/2008 |
| WO | WO 2008/045068 A1 | 4/2008 |
| WO | WO 2008/045081 A1 | 4/2008 |
| WO | WO 2008/063152 A1 | 5/2008 |
| WO | WO 2008/063154 A1 | 5/2008 |
| WO | 2009/029401 A3 | 8/2009 |

OTHER PUBLICATIONS

European Search Report dated Jan. 23, 2012 (EP Application No. 10005249), 5 pgs.

Official Action for U.S. Appl. No. 12/419,080, dated Mar. 23, 2012, 12 pgs.

EP Search Report (EP App. No. 10002809.1), dated Nov. 21, 2011, 5 pgs.

EP Exam Report (EP App. No. 08828100.1), dated Dec. 23, 2010, 5 pgs.

Official Action for U.S. Appl. No. 12/057,497, dated Feb. 2, 2012, 17 pgs.

Official Action for U.S. Appl. No. 12/485,559, dated Jun. 12, 2012, 15 pgs.

Official Action of U.S. Appl. No. 12/419,080, dated Aug. 1, 2012, 8 pgs.

English translation of Official Action for Chinese Application No. 200880102315.X, dated Sep. 25, 2012, 32 pgs.

Official Action for Chinese Application No. 201010206330.8, dated Oct. 8, 2012, 6 pgs.

English translation of Official Action for Chinese Application No. 201010206330.8, dated Oct. 8, 2012, 8 pgs.

Official Action for Chinese Application No. 201010156573,5, dated Oct. 10, 2012, 6 pgs.

English translation of Official Action for Chinese Application No. 201010156573.5, dated Oct. 10, 2012, 8 pgs.

Official Action for U.S. Appl. No. 12/419,080, dated Dec. 7, 2012, 8 pgs.

* cited by examiner

TRANSLATING VARIABLE AREA FAN NOZZLE PROVIDING AN UPSTREAM BYPASS FLOW EXIT

RELATED APPLICATIONS

This application is a continuation-in-part of international application Serial No. PCT/US08/72448, filed Aug. 7, 2008, which claims the benefit of priority of U.S. Provisional Application Ser. No. 60/954,756, filed Aug. 8, 2007, the disclosures of which are hereby incorporated by reference in their entirety.

TECHNICAL FIELD

The present invention generally relates to gas turbine aircraft engines, and particularly relates to a translating variable area nozzle assembly for a turbofan aircraft engine for use in selectively controlling the fan bypass flow exhausted from the engine in order to adjust the engine's performance under varying flight conditions.

BACKGROUND

Typical aircraft turbofan jet engines include a fan that draws and directs a flow of air into a nacelle and into and around an engine core. The nacelle surrounds the engine core and helps promote the laminar flow of air around the core. The flow of air that is directed into the engine core is initially passed through a compressor that increases the air flow pressure, and then through a combustor where the air is mixed with fuel and ignited. The combustion of the fuel and air mixture causes a series of turbine blades at the rear of the engine core to rotate, and to drive the engine's rotor and fan. The high-pressure exhaust gases from the combustion of the fuel and air mixture are thereafter directed through an exhaust nozzle at the rear of the engine.

Bypass flow is air that is directed around the engine core. In turbofan engines, the bypass flow typically provides the main thrust for an aircraft. The bypass flow also can be used to help slow a landed aircraft. Thrust reversers mounted in the nacelle structure selectively reverse the direction of the bypass flow to generate reverse thrust. During normal engine operation, the bypass flow may or may not be mixed with the engine core exhaust before exiting the engine assembly.

Several turbofan engine parameters are important to optimize design characteristics and performance. An engine's bypass ratio (BPR) is the ratio of the air mass that passes through the engine's fan duct to that passing through the engine core. Higher BPR engines can be more efficient and quiet than lower BPR engines. In general, a higher BPR results in lower average exhaust velocities and less jet noise at a specific thrust rating. A turbofan engine's performance is also affected by the engine's fan pressure ratio (FPR). FPR is the ratio of the air pressure at the engine's fan nozzle exit to the pressure of the air entering the fan. The lower the FPR, the lower the exhaust velocity, and the higher an engine's propulsive efficiency. Reducing an engine's FPR can reach a practical limit, however, as a low FPR can cause engine fan stall, blade flutter or compressor surge under certain operating conditions.

One solution to these problems includes varying the fan nozzle exit area of a high-BPR engine during operation to optimize engine performance under various flight conditions. By selectively varying the fan nozzle's exit area, an engine's bypass flow characteristics can be adjusted to match a particular flight condition. Unfortunately, prior variable area nozzle systems typically have been heavy, expensive and somewhat complex in their structure and operation, and generally require the coordinated movement of multiple components that employ complex drive mechanisms.

Accordingly, a need exists for a variable area nozzle assembly for turbofan aircraft engine that promotes a cost effective, simple and efficient operation for control of engine output under certain flight conditions.

SUMMARY

In one embodiment, a variable area fan nozzle assembly for a turbofan engine can include a nacelle having an aft edge and a translating nozzle segment having a forward edge and a first end. The nozzle segment can be movably disposed behind the aft edge such that an upstream bypass flow exit is defined between the aft edge and the forward edge when the nozzle segment is in a deployed position. A deflector can be disposed between the aft edge and the forward edge proximate to the first end. The deflector can substantially prevent bypass flow from exiting the upstream bypass flow exit in a region that is proximate to the first end.

In another embodiment, a nacelle assembly for a turbofan aircraft engine having a centerline can include a forward nacelle portion having an outer fairing and a trailing edge, and a translatable variable area fan nozzle including at least one nozzle segment. The nozzle segment can include a leading edge and a first end, and can be selectively movable between a stowed position and one or more deployed positions. In the deployed position, an upstream bypass flow exit can be formed between the trailing edge and the leading edge. The nacelle assembly can further include a split beavertail fairing having an upstream fairing portion on the outer fairing of the forward nacelle portion and a downstream fairing portion on the first end of at least one nozzle segment. When the nozzle segment is in its stowed position, the upstream fairing portion and the downstream fairing portion can combine to form a substantially continuous outer surface extending between the forward nacelle portion and the nozzle segment. The nacelle assembly can further include a deflector located proximate to the first end of the nozzle segment. The deflector can configured to substantially block air flow that exits the nacelle assembly through the upstream bypass flow exit from contacting the associated split beavertail fairing when the nozzle segment is in the deployed position.

Another embodiment includes a variable area fan nozzle assembly for a turbofan engine assembly having a primary bypass flow exit for discharging engine bypass flow. The assembly can include a forward nacelle portion having a trailing edge and a translating nozzle segment having a leading edge and a first end. The assembly also can include support means for movably supporting the first end of the translating nozzle segment such that the nozzle segment is movable between a stowed position and a deployed position. An upstream bypass flow exit can be formed between the leading edge and the trailing edge when the nozzle segment is in the deployed position. A fairing can at least partially cover the support means. The assembly can further include means for substantially preventing air from passing through the upstream bypass flow exit in a region proximate to the fairing.

The foregoing and other features, aspects, and advantages of the invention will be apparent from a reading of the following detailed description together with the accompanying drawings, which are briefly described below.

BRIEF DESCRIPTION OF THE DRAWINGS

According to common practice, the various features of the drawings discussed below are not necessarily drawn to scale.

Dimensions of various features and elements in the drawings may be expanded or reduced to more clearly illustrate the embodiments of the invention.

DETAILED DESCRIPTION

FIGS. 1-8 show one embodiment of a translating variable area fan nozzle assembly (VAFN) for a turbofan engine 10.

Figure 1:
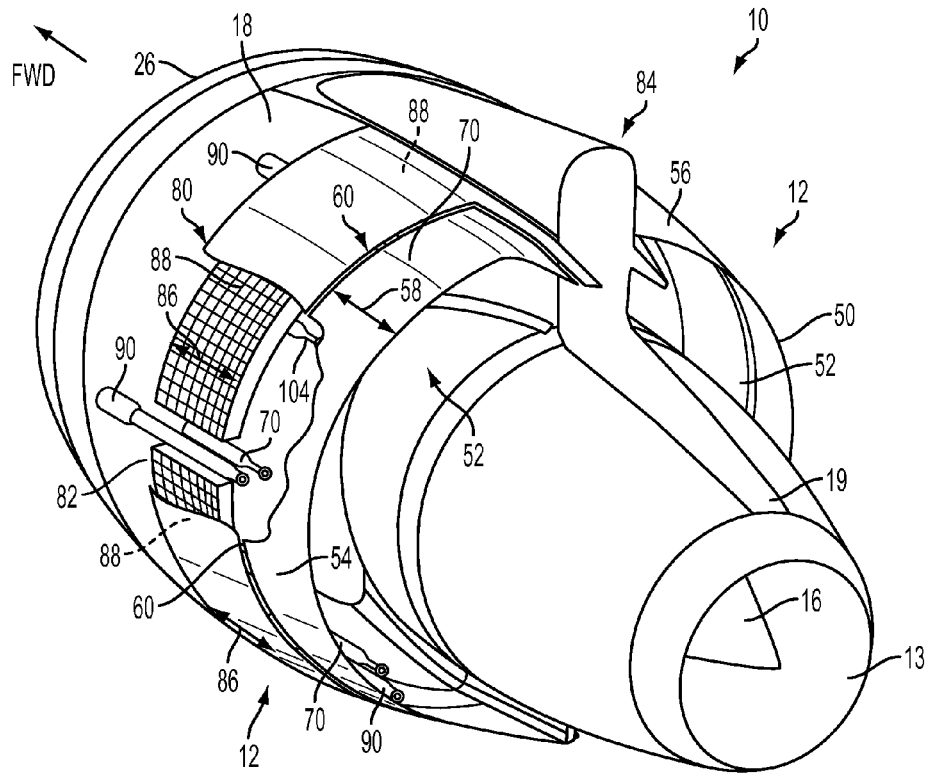
FIG. 1 is a perspective view of an aircraft engine having a cascade-type thrust reverser and a translating variable area fan nozzle assembly.
Figure 2:
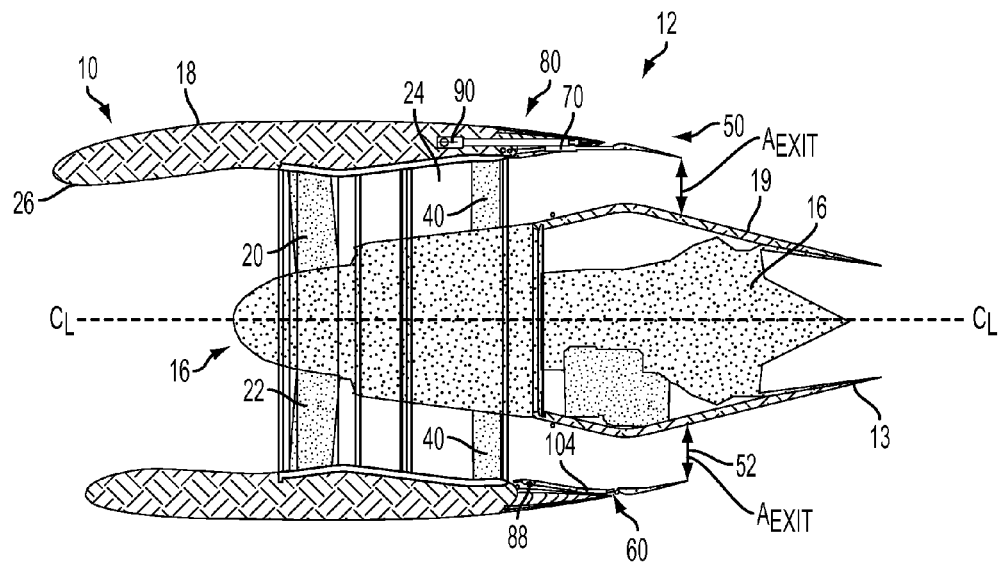
FIG. 2 is a longitudinal cross section of the aircraft engine shown in FIG. 1.

Referring to FIGS. 1 and 2, the engine 10 includes a trailing edge fan nozzle assembly 12 having a translating nozzle 50 that can be selectively adjusted, for example, as the engine 10 operates under different flight conditions. As discussed above, such an adjustment can be used to optimize an engine's performance. As shown in FIG. 2, the translating nozzle 50 can be selectively translated (i.e., moved fore and aft) to vary the fan nozzle's exit area "$A_{exit}$" in order to optimize engine performance, and as described in detail below, to adjust an amount of engine bypass flow spilled through an upstream exit 60 formed by the variable area fan nozzle assembly 12. By bleeding or spilling off excess fan flow through the upstream exit 60 before the excess air flow reaches the primary fan nozzle exit 52, lower fan pressure ratios for the same amount of delivered mass flow can be obtained, thereby increasing stall margins and avoiding engine malfunction and shutdown. For purposes of illustration, the variable area fan nozzle assembly 12 is shown in the context of a turbofan jet aircraft engine 10. The engine 10 can be mounted to a wing or fuselage of an aircraft, for example, by a pylon or other similar support (not shown in the figures).

As shown in FIG. 2, the engine 10 includes an engine core 16 and a stationary nacelle 18 surrounding the core 16. The engine core 16 is housed within a core cowl 19. The engine's fan 20 is positioned within an upstream portion of the nacelle 18, and includes a plurality of fan blades 22 that are mounted on the engine's rotor (not shown). The fan blades 22 rotate about the engine's centerline $C_L$ and draw a flow of air into an inlet end 26 of the engine 10. An annular bypass duct 24 is defined between the engine core 16 and the nacelle 18. The air flow drawn into the engine 10 is accelerated by the rotating fan blades 22, and a portion of the incoming air flow is directed into and through the engine core 16.

Bypass flow enters the upstream end of the nacelle 18 and flows around and past the engine core 16. The bypass flow is accelerated by the rotating fan blades 22 and passes through the bypass duct 24 and past stators 40, and exits the engine 10 through the variable area fan nozzle assembly 12. The high-pressure heated exhaust gases from the combustion of the fuel and air mixture exit the engine core 16 through a primary exhaust nozzle 13 at the aft end of the engine 10.

Figure 3:
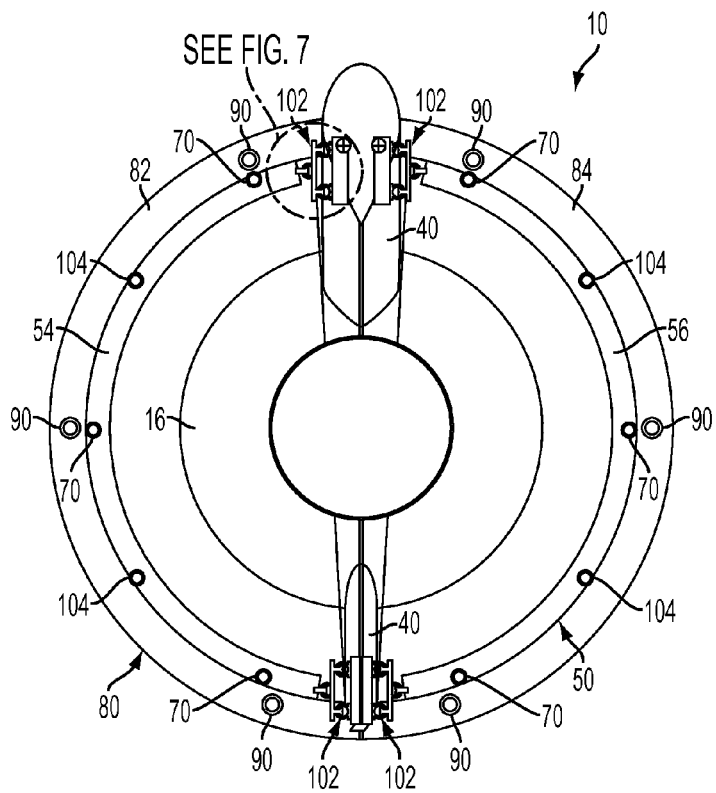
FIG. 3 is a rear elevation of the aircraft engine shown in FIGS. 1-2.

In the engine assembly 10 shown in FIGS. 1-8, the translating nozzle 50 is a nozzle-like annular airfoil structure mounted at the trailing end of a cascade-type thrust reverser 80 that circumscribes the engine core cowl 19 immediately aft of the nacelle 18. As shown in FIG. 2, a downstream nozzle exit 52 between the trailing edge of the fan nozzle 50 and the core cowl 19 defines a fan nozzle exit area "$A_{exit}$". Due to the longitudinal variations in the diameter of the core cowl 19, selective fore and aft movement of the translating nozzle 50 changes the size of the fan nozzle exit area $A_{exit}$. As shown in FIG. 1, the fan nozzle 50 can include a first arcuate nozzle section 54 and a second arcuate nozzle section 56, each nozzle section 54, 56 being axially translatable in the direction of the bidirectional arrow 58. Translation of the translating nozzle 50 effects a desired size of the upstream exit 60 (shown in FIG. 2), and also varies the outlet geometry and effective exit area $A_{exit}$ of the downstream nozzle exit 52. Hence, when the translating nozzle 50 is deployed, there is an increase in the bypass flow that is discharged from the engine assembly 10 through both the upstream exit 60 and the enlarged downstream nozzle exit 52. As shown in FIGS. 1-3, the translating nozzle 50 can be selectively translated fore and aft by a plurality of linear nozzle actuators 70, for example.

The cascade-type thrust reverser 80 can be positioned forward of the translating nozzle 50 in order to selectively block and redirect bypass flow from the bypass duct 24 in a manner known in the art. In FIG. 1, the thrust reverser 80 and the translating nozzle 50 are both in their stowed positions. As shown in FIG. 1, the thrust reverser 80 can include a first arcuate sleeve section 82 and an opposed second arcuate sleeve section 84 (shown in FIG. 3). As indicated by bi-directional arrow 86 in FIG. 1, the thrust reverser sleeve sections 82, 84 can be translated in the fore and aft directions by a plurality of spaced sleeve actuators 90. In a stowed position, the thrust reverser sleeve sections 82, 84 cover an array of cascade vanes 88. The cascade vanes 88 are indicated by dashed lead lines in FIG. 1 because they are not visible when the thrust reverser 80 is in its stowed position. Axial translation of the thrust reverser sleeve sections 82, 84 in the aft direction to a deployed position and deployment of a series of blocker doors 134 within the bypass duct 24 (as indicated by arrow 136 in FIG. 8) causes bypass air flow to exit the bypass duct 24 through the cascade vanes 88 which turn the exiting flow in a generally forward direction to create reverse thrust.

FIG. 3 is a partial section view of the aft end of the engine 10, and illustrates one arrangement of the nozzle and sleeve actuators 70, 90, respectively, around the periphery of the engine 10. As shown in FIG. 1, and more clearly in FIG. 3, the sleeve half section 82 and the nozzle half-section 54 cooperate to generally define an approximately 180-degree sector of the combined thrust reverser and translating nozzle structure. Likewise, sleeve half section 84 and nozzle half section 56 cooperate to generally define an opposed approximately 180-degree sector of the thrust reverser and translating nozzle structure. Together, these approximate 180-degree sectors cooperate to define the complete thrust reverser/translating nozzle structure.

Figure 7:
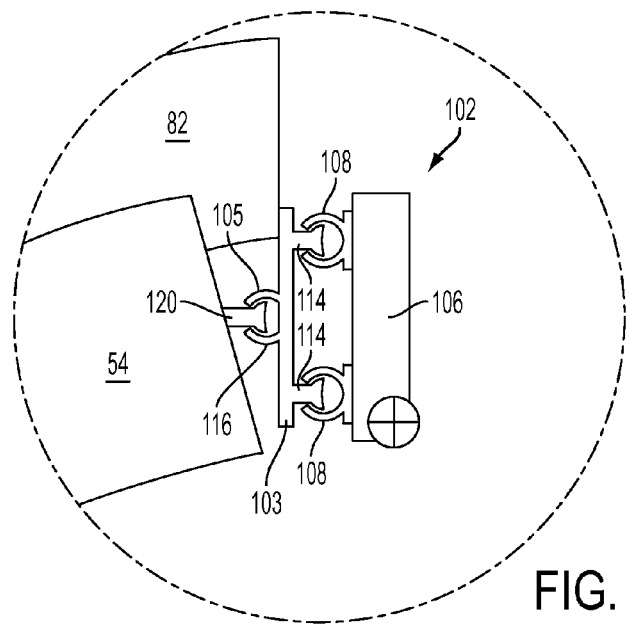
FIG. 7 is a cross sectional view of a guide structure for movably supporting a thrust reverser sleeve and a variable area fan nozzle ring.

As shown in FIGS. 1-3, the thrust reverser sleeve sections 82, 84 can each be selectively translated in the fore and aft directions by one or more circumferentially spaced sleeve actuators 90 that are connected to the nacelle 18. In the embodiment shown, three actuators 90 are used for each sleeve half-section 82, 84. As discussed above, each section 54, 56 of the translating nozzle 50 can be selectively translated by one or more circumferentially spaced nozzle actuators 70. In the embodiment shown, each nozzle actuator 70 is disposed between a thrust reverser sleeve section 82, 84 and a respective fan nozzle section 54, 56. The sleeve actuators 90 and the nozzle actuators 70 can be electrical, mechanical, pneumatic, hydraulic, or the like, and can be interconnected by appropriate power cables and conduits (not shown). The number and arrangement of nozzle and sleeve actuators 70, 90 can vary according to the thrust reverser and nozzle assembly configurations or other factors. As shown in FIG. 3, the nozzle sections 54, 56 can be movably mounted on the engine 10 by upper and lower guide structures 102. FIG. 7 shows a detail view of one embodiment of a guide structure 102. As shown in FIGS. 1-3, guide tubes 104 can be mounted to the nacelle 18, and can extend into the nozzle sections 54, 56 to stabilize the nozzle sections 54, 56 against undesirable translation and/or vibration. In addition or alternatively, guide tubes can be used to stabilize the thrust reverser sleeves 82, 84.

The translating nozzle 50 can be a continuous nozzle (not shown in the figures), or as shown in FIG. 3, can include two or more arcuate nozzle sections having airfoil profiles. The upstream exit 60 shown in FIG. 2 is formed when the translating nozzle 50 is deployed in the aft direction away from the thrust reverser sleeve sections 82, 84, and can have the form of a generally circular annular gap. Alternatively, the upstream exit 60 can have other non-circular shapes. The gap 60 between the nozzle sections 54, 56 and the sleeve sections 82, 84 can be continuous, or can be interrupted at one or more locations, such as, for example, at points of separation between nozzle segments 54, 56 of the translating nozzle 50. As shown in FIGS. 2-3, the bypass duct 24 can be interrupted at one or more locations by one or more stators 40, or the like.

The translating nozzle 50 and surrounding structure are described below with reference to FIGS. 4-7. In FIGS. 4-7, elements that are obscured or partially obscured due to intervening elements are indicated by dashed lead lines.

Figure 4:
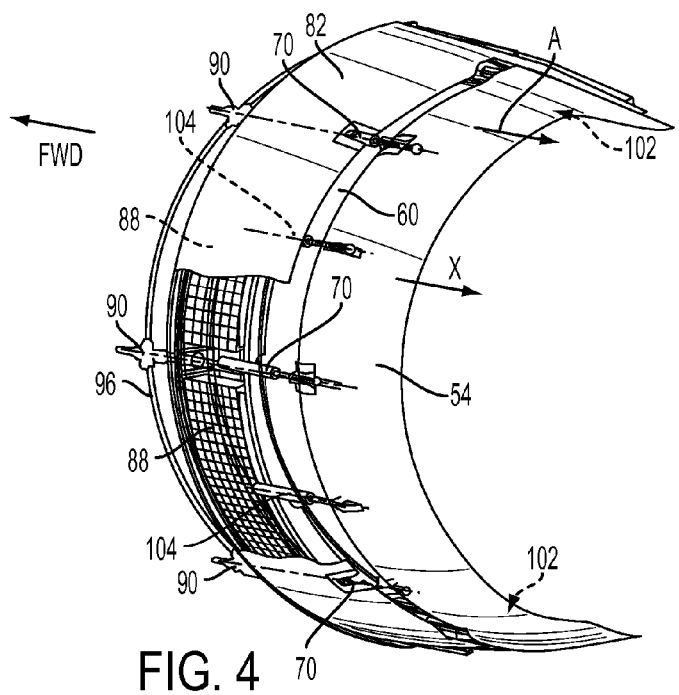
FIG. 4 is a perspective view of the thrust reverser and translating variable fan area nozzle assembly portions of the aircraft engine shown in FIGS. 1-3 with a thrust reverser sleeve in a stowed position, and a variable area fan nozzle ring in a deployed position.
Figure 5:
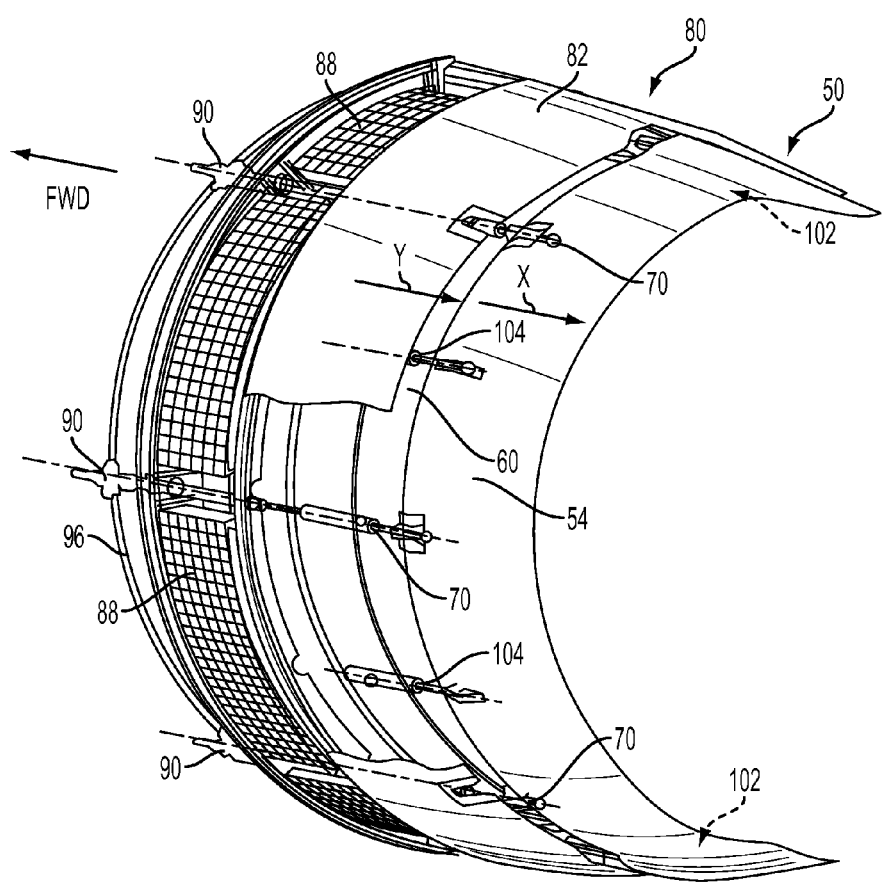
FIG. 5 is a perspective view of the thrust reverser and translating variable area fan nozzle assembly shown in FIG. 4 with both the thrust reverser sleeve and the variable area fan nozzle ring in deployed positions.

FIG. 4 is a partial view of one embodiment of a mounting structure for a first nozzle section 54 of the translating nozzle 50 and the corresponding, adjacent first sleeve section 82 of the thrust reverser 80. The second nozzle section 56 of the translating nozzle 50 and the second sleeve section 84 of the thrust reverser 80, which are shown in FIGS. 1 and 3, can be mounted in a similar manner (not shown). In FIG. 4, the thrust reverser 80 is in a stowed position, and the first sleeve section 84 covers an associated portion of the cascade vanes 88. Also in FIG. 4, the translating nozzle 50 is in an open or deployed position, and the upstream exit 60 is disposed between the first nozzle section 54 and the first sleeve section 84. Rearward axial translation of the first nozzle section 54 from its stowed position to its deployed position is indicated in FIGS. 4-5 by directional arrow "X". As shown in FIG. 4, the nozzle actuators 70 can extend from the sleeve section 82 and across the upstream exit 60, and can connect to a forward portion of the nozzle section 54. The guide tubes 104 can also extend from the sleeve section 82 and across the upstream exit 60, and can connect to a forward portion of the nozzle section 54. A sleeve actuation cable 96 can interconnect two or more of the sleeve actuators 90 to power the actuators 90, and/or to synchronize actuation of two or more actuators 90.

FIG. 5 shows the first thrust reverser sleeve section 82 and the first translating nozzle section 54 in their deployed positions. Rearward axial translation of the first sleeve section 82 from its stowed position (as shown in FIG. 4) to its deployed position (as shown in FIG. 5) is indicated in FIG. 5 by directional arrow "Y". Rearward translation of the sleeve section 82 exposes the cascade vanes 88 during operation of the thrust reverser 80.

Figure 6:
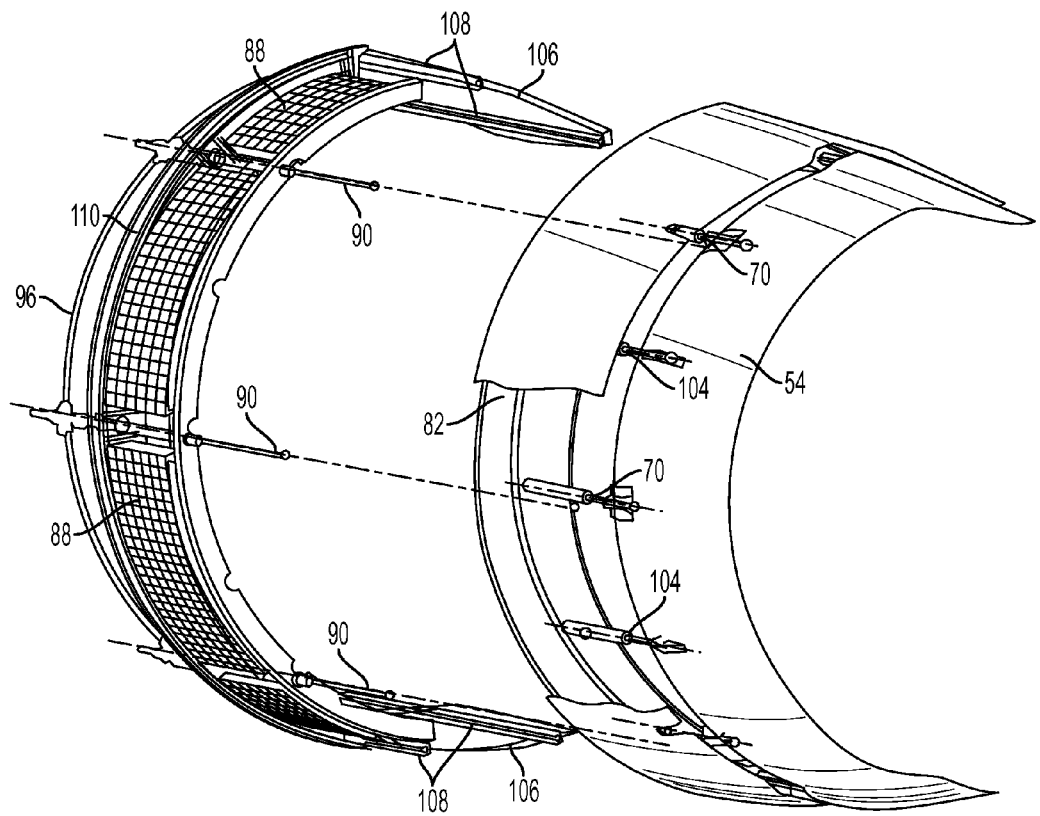
FIG. 6 is an exploded perspective view of the thrust reverser and translating variable area fan nozzle assembly shown in FIGS. 4-5.

FIG. 6 is an exploded view showing the first sleeve section 82 and its corresponding first nozzle section 54 separated from the cascades 88 and sleeve actuators 90. As shown in FIG. 6, one or more nozzle actuators 70 can movably connect the nozzle section 54 to the thrust reverser sleeve section 82.

FIG. 7 shows one embodiment of the upper or lower guide structures 102 for movably connecting a thrust reverser segment 82 and a nozzle section 54 to an engine 10. Referring generally to FIGS. 3 and 6 and particularly to FIG. 7, the guide structure 102 can include a beam 106 that can be fixedly attached to a transverse bulkhead 110 on an aft end of a nacelle 18. The beam 106 can include one or more longitudinally extending guide tracks 108. A slide 103 can include one or more longitudinally extending track bars 114 that are slidably received within the guide tracks 108 of the fixed beam 106. The slide 103 is connected to the thrust reverser sleeve section 82, and thereby slidably connects the sleeve section to the beam 106. The slide 103 can also include an axially extending track guide 116 in which a translating nozzle track bar 120 on the nozzle section 54 is slidably received, thus slidably connecting the nozzle section 54 to the nacelle 18. Accordingly, the nozzle section 54 can axially translate as the track bar 120 slides within the track guide 116. The nozzle section 54 is thereby slidably mounted with respect to the sleeve section 82 of the thrust reverser 80. The translating sleeve section 82 and the track bar 120 can be actuated through conventional actuation means, such as mechanical, electric, hydraulic or pneumatic or other equivalent actuators, for example.

Figure 8:
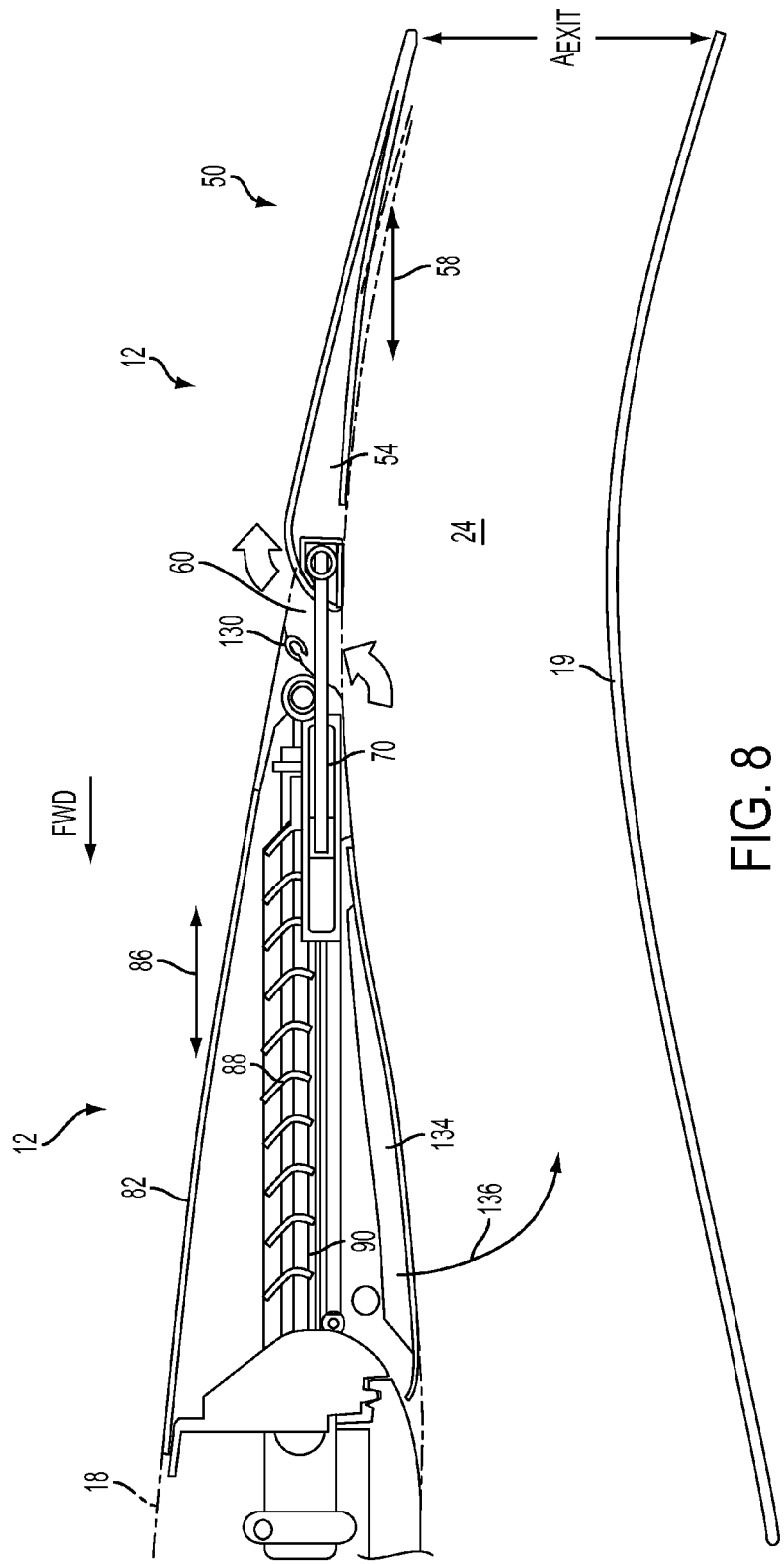
FIG. 8 is a cross sectional view of the thrust reverser and variable area nozzle assembly shown in FIGS. 1-6.

FIG. 8 illustrates one method of operating the nozzle section 54 to bleed or spill off excess bypass flow through the upstream exit 60. As described above, the sizes of the upstream exit 60 and the nozzle exit area $A_{exit}$ can be varied in order to achieve different engine operating conditions. The upstream exit 60 acts as a "bleed" exit that diverts at least some bypass flow from the bypass duct 24. FIG. 8 shows a partial section of a downstream portion of the nozzle assembly 12, and shows a portion of the bypass air flow (indicated by curved arrows) exiting the bypass duct 24 through the annular upstream exit 60 in one mode of operation of the nozzle assembly 12. In FIG. 8, the first nozzle section 54 of the translating nozzle 50 is rearwardly displaced from the first thrust reverser sleeve section 82 by its associated nozzle actuators 70. The second nozzle section 56 can be similarly and simultaneously rearwardly displaced from the second thrust reverser sleeve section 84 by its associated nozzle actuators 70. As shown in FIG. 8, the thrust reverser 80 can include a plurality of blocker doors 134 that are pivotally connected to the first sleeve section 82 and swing in the direction of the curved arrow 136 to selectively block and redirect the bypass flow from the bypass duct 24 and through the cascade vanes 88 during thrust reverser operation.

Still referring to FIG. 8, a high pressure seal 130 can be disposed between the thrust reverser sleeve section 82 and the first nozzle section 54, such as on the trailing edge of the sleeve section 82, for example. In certain modes of operation, when the sleeve section 82 and nozzle section 54 are drawn together, the seal 130 can operate to substantially seal any gap between the adjacent sleeve section 82 and nozzle section 54, and thereby substantially prevent bypass air flow from passing between the sleeve section 82 and nozzle section 54. Similarly, a seal 130 can be disposed between the second thrust reverser sleeve section 84 and the second nozzle section 56. Alternatively, the seal 130 can be mounted on the leading edges of the nozzle sections 54, 56, for example.

As discussed above, the nozzle and sleeve actuators 90, 70 can be mechanical, hydraulic, pneumatic or electric actuators, for example. In one embodiment, the nozzle actuator 70 is a constant opening air spring damper with hydraulic closing override, and the sleeve actuator 90 is an electric actuator. Alternatively or in addition, one or more of the actuators 70, 90 can be like an actuator described in U.S. Pat. No. 7,174,828 or in U.S. Pat. Application Publication No. 2008/0084130A1, both assigned to Goodrich Actuation Systems Ltd., for example, the disclosures of which are hereby incorporated by reference.

FIGS. 9A-11 show a variable area nozzle assembly 212 for a turbofan engine having no cascade-type thrust reverser. The nozzle assembly 212 can be mounted to a nacelle 18 as generally illustrated in FIG. 1, but with no intervening thrust reverser. Generally, elements shown in FIG. 9A-11 that are analogous to elements shown in FIGS. 1-8 have similar reference numerals preceded by a "2" or "3."

Figure 9B:
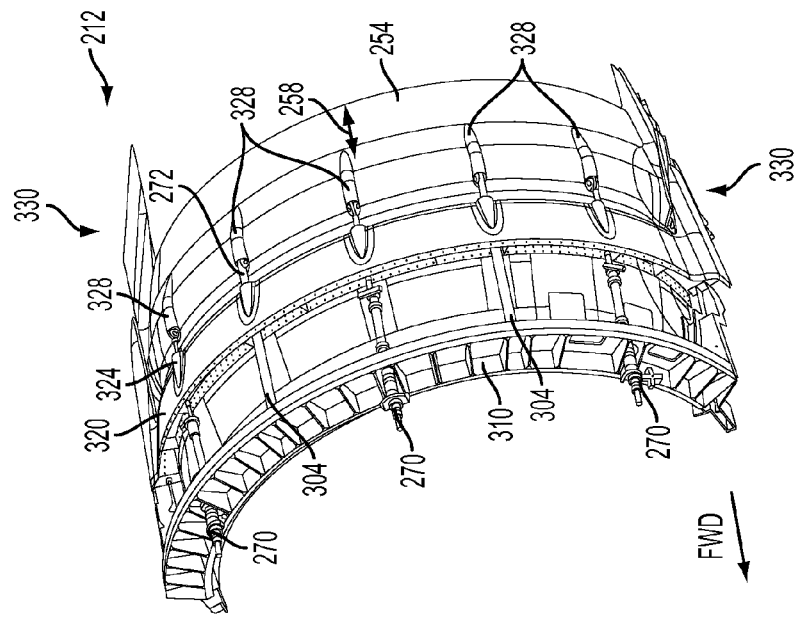
FIG. 9B is a perspective view of the variable area fan nozzle assembly shown in FIG. 9A with the translating nozzle ring in a deployed position.
Figure 9A:
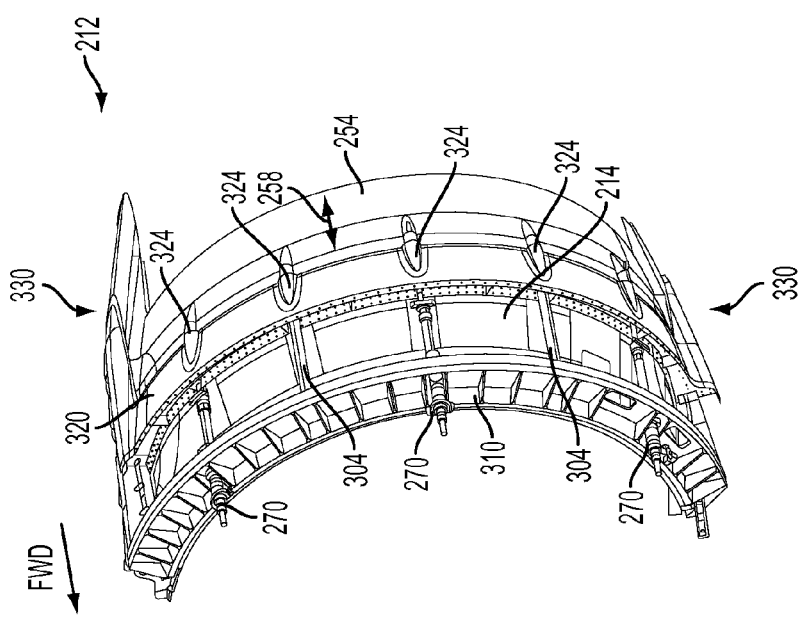
FIG. 9A is a perspective view of a variable area fan nozzle assembly for use with an aircraft engine having no cascade-type thrust reverser with a translating nozzle ring in a stowed position.

FIGS. 9A and 9B are partial cutaway illustrations of a variable area nozzle assembly 212. In the cutaway illustrations, a transverse bulkhead 310 and an outer duct structural liner 214 of an associated stationary nacelle are visible. The nozzle assembly 212 includes a translating nozzle assembly that includes two opposed nozzle sections, of which one nozzle section 254 is shown in FIGS. 9A and 9B. In FIG. 9A, the nozzle section 254 is in a closed or stowed position, and in FIG. 9B, the nozzle section 254 is in an open or deployed position.

The nozzle section 254 is mounted on the aft end of a stationary nacelle structure, such as to a transverse bulkhead 310. Peripherally spaced nozzle actuators 270 can be attached to the bulkhead 310 at one end, and attached to a nozzle section 254 at their opposite ends. Guide tubes 304 can also be attached to the bulkhead 310 at one end, and attached to a nozzle section 254 at their opposite ends. The nozzle actuators 270 can act in unison to translate the nozzle section 254 in the direction of the bidirectional arrow 258. Referring to FIG. 9B, actuator shafts 272 of the nozzle actuators 270 can pass through an outer fairing 320 located forward of the nozzle section 254. Upstream fairing 324 can be provided at the points where the actuator shafts 272 pass through the outer fairing 320 in order to reduce drag induced by the actuators 270. Similarly, downstream fairing 328 can be provided at the points where the actuator shafts 272 pass through the nozzle section 254.

Figure 10:
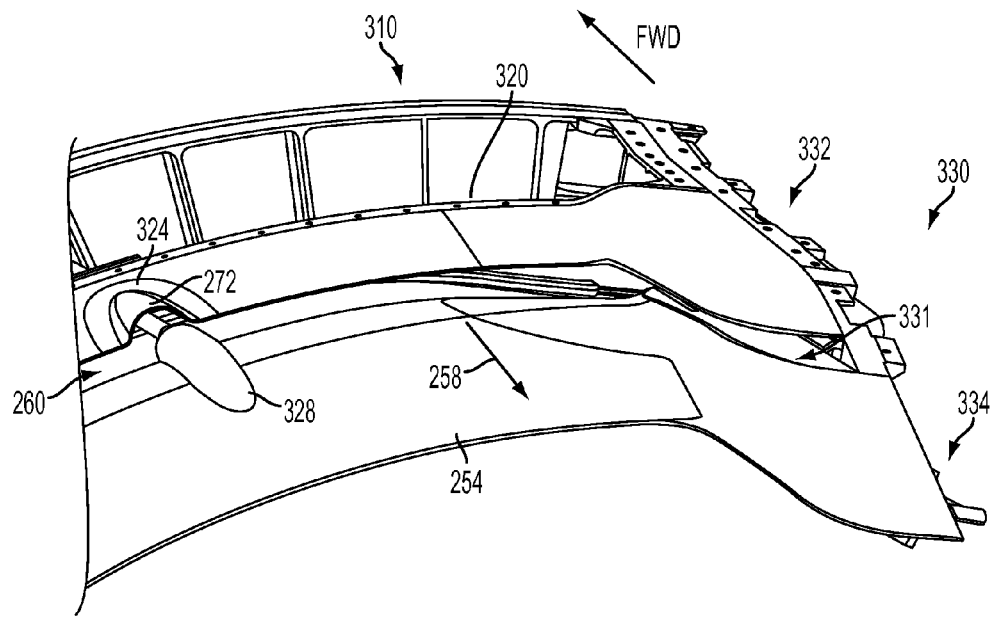
FIG. 10 is a perspective view of a portion of the variable area fan nozzle assembly shown in FIGS. 9A-9B with the translating nozzle ring in a deployed position.
Figure 11:
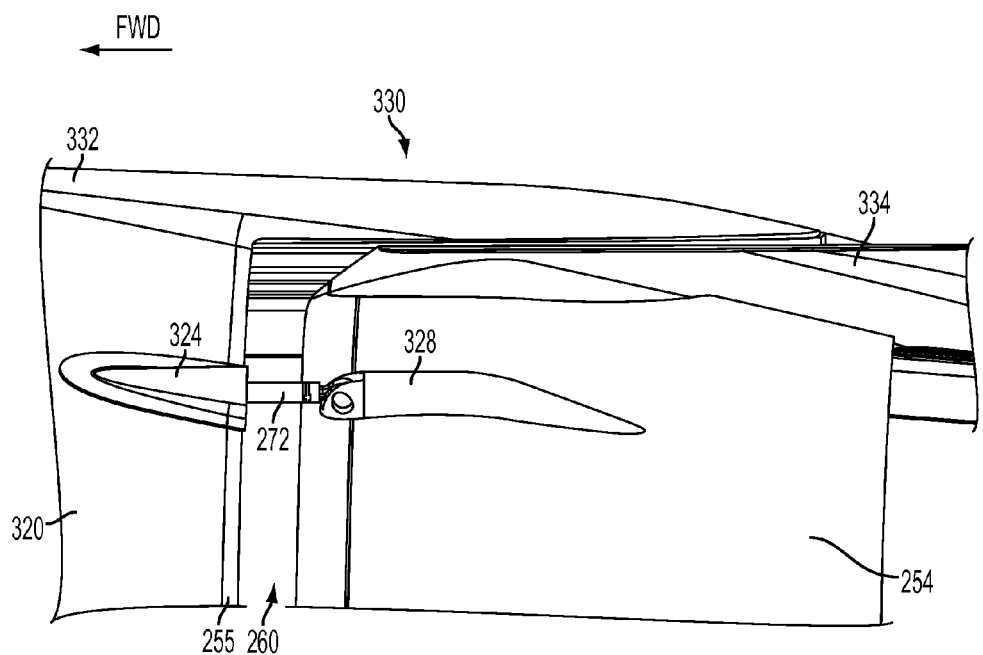
FIG. 11 is a side elevation view of a portion of the variable area fan nozzle assembly shown in FIGS. 9A-9B with the translating nozzle ring in a deployed position.
Figure 12:
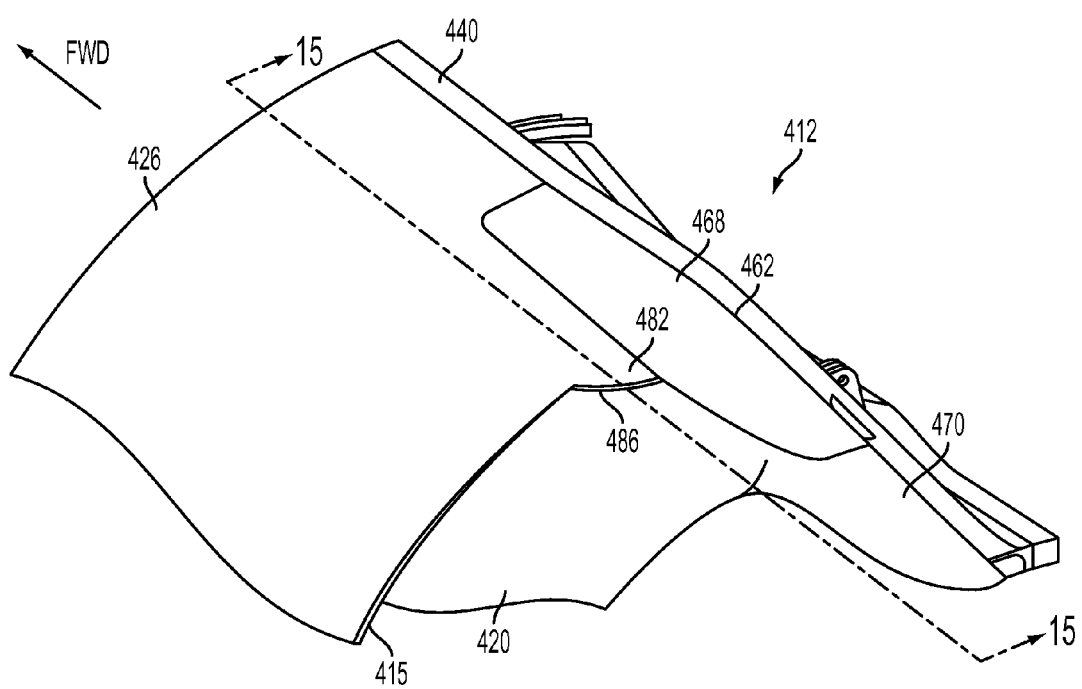
FIG. 12 is a perspective view of a portion of one embodiment of a variable area fan nozzle assembly according to the invention with a translating ring segment in a stowed position.
Figure 20:
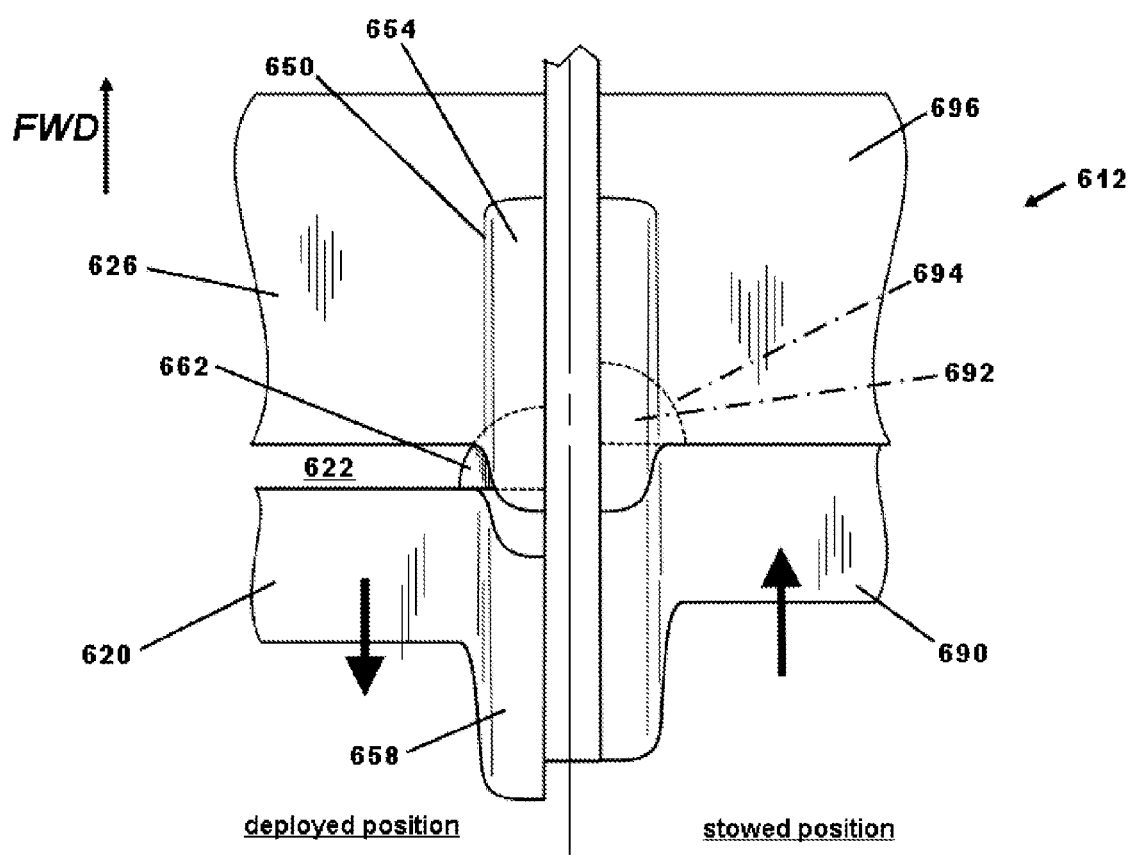
FIG. 20 is a top plan view of a portion of the variable area fan nozzle assembly shown in FIG. 19 showing translating ring segment in a deployed position on the left half side of the figure, and showing the translating ring segment in a stowed position on the right half side of the figure.

As shown in FIG. 10, each end of each nozzle section 254 can terminate at a split beavertail fairing 330. As shown in FIGS. 10 and 11, each end of an outer fairing 320 of a nacelle can include an upstream portion 332 of a split beavertail fairing 330, and each end of a translating nozzle section 254 can include a downstream portion 334 of the split beavertail fairing 330. Rearward translation of the nozzle section 254 creates an upstream exit 260 between the nozzle section 254 and a trailing edge of the outer fairing 320, and separates the upstream portion 332 and the downstream portion 334 of the split beavertail fairing 330, thus forming an elongated gap 331. As shown in FIG. 11, a forward edge 255 of the nozzle section 254 can include an aerodynamic profile such as a bullnose profile or a teardrop profile, for example, to facilitate smooth air flow through the upstream exit 260, and to minimize flow disruption caused by the actuator shafts 272, or the like. FIGS. 12-5 20 show various embodiments of nacelles with a translating variable area fan nozzle assemblies that are configured to substantially reduce such noise and enhance engine performance.

Figure 13:
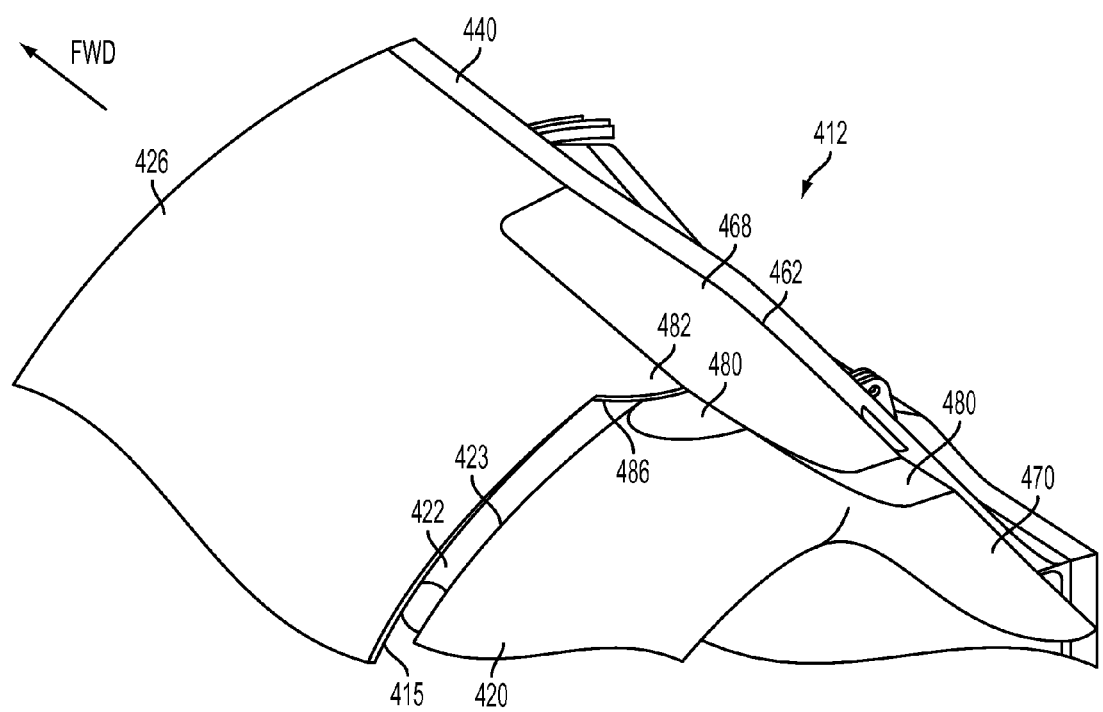
FIG. 13 is a perspective view of the portion of the variable area fan nozzle assembly shown in FIG. 12 with the translating ring segment in a deployed position.
Figure 14:
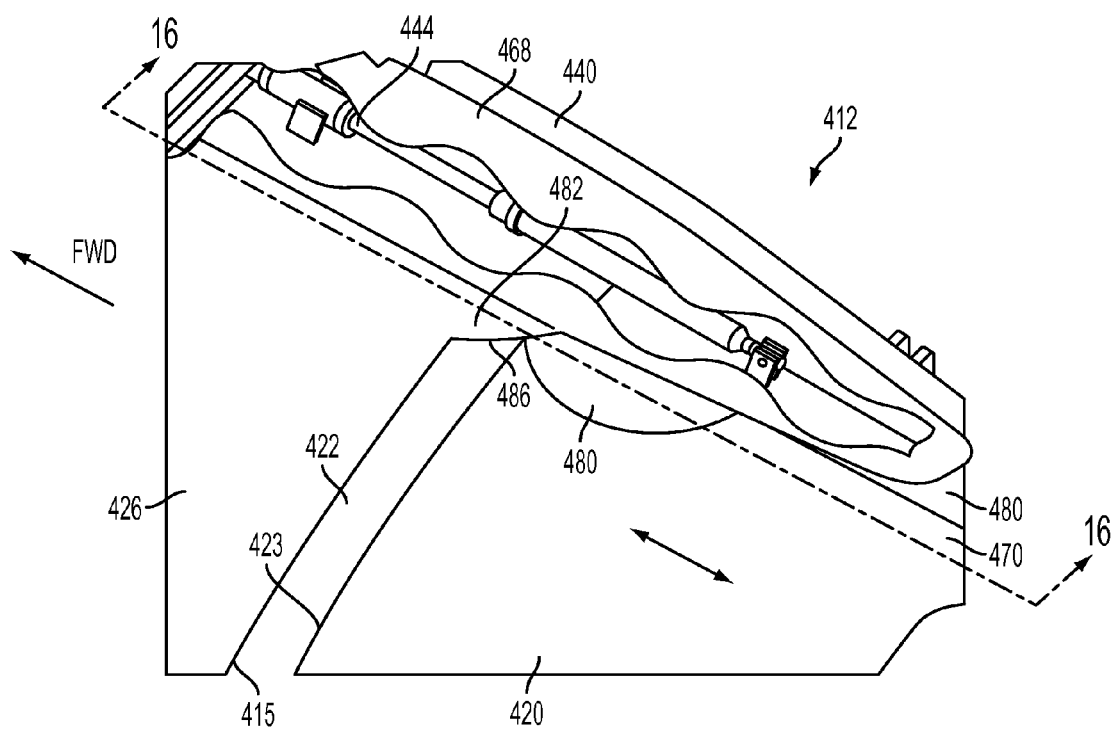
FIG. 14 is an enlarged perspective view of the deployed translating ring segment shown in FIG. 13.

FIGS. 12-16 show portions of a translating variable area nozzle assembly 412 mounted aft of a trailing edge 415 of a nacelle portion 426. The nacelle portion 426 can be either a stationary forward nacelle cowl of an engine without a cascade-type thrust reverser (like that shown in FIGS. 9A-9B, for example), or a movable thrust reverser sleeve section (like that shown in FIG. 1, for example). A split beavertail fairing 462 includes an upstream fairing portion 468 on an end of a forward nacelle portion/thrust reverser sleeve section 426, and a downstream fairing portion 470 on an end of a nozzle segment 420. As shown in FIG. 12, when the translating nozzle segment 420 is in a stowed position, the upstream fairing portion 468 and the downstream fairing portion 470 combine to form a substantially continuous and substantially smooth contoured outer surface. As discussed above, the beavertail fairing 462 covers the support and guide mechanism 440 that movably attaches the nozzle segment 420 to a nacelle. As shown in FIG. 14, the beavertail fairing 462 also can cover an actuator 444 mounted adjacent to the guide mechanism 440, or other adjacent components.

As shown in FIG. 12, a projection 482 rearwardly extends from the trailing edge 415 of the nacelle portion 426, and is positioned adjacent to the upstream fairing portion 468. The projection 482 can include an edge 486 that aftwardly extends from the trailing edge 415 of the nacelle portion 426 toward an edge of the upstream fairing portion 468. The edge 486 can be a curved edge as shown in the figures, an oblique straight edge, or can any other shape or profile. When the nozzle segment 420 is in the stowed position shown in FIG. 12 and FIG. 15, the projection 482 can at least partially overlap an upper surface of the nozzle segment 420 to form a substantially continuous and substantially smooth exterior surface. As shown in FIGS. 13-16, the upstream beavertail fairing portion 468 and the projection 482 can be configured to abut and slide over a substantially flat opposed surface 480 on the nozzle segment 420. Any gap between the forward beavertail fairing portion 468 and the surface 480 and between the projection 482 and the surface 480 can be minimized such that substantially no exiting bypass flow passes through such gap when the nozzle segment 420 is deployed.

Figure 16:
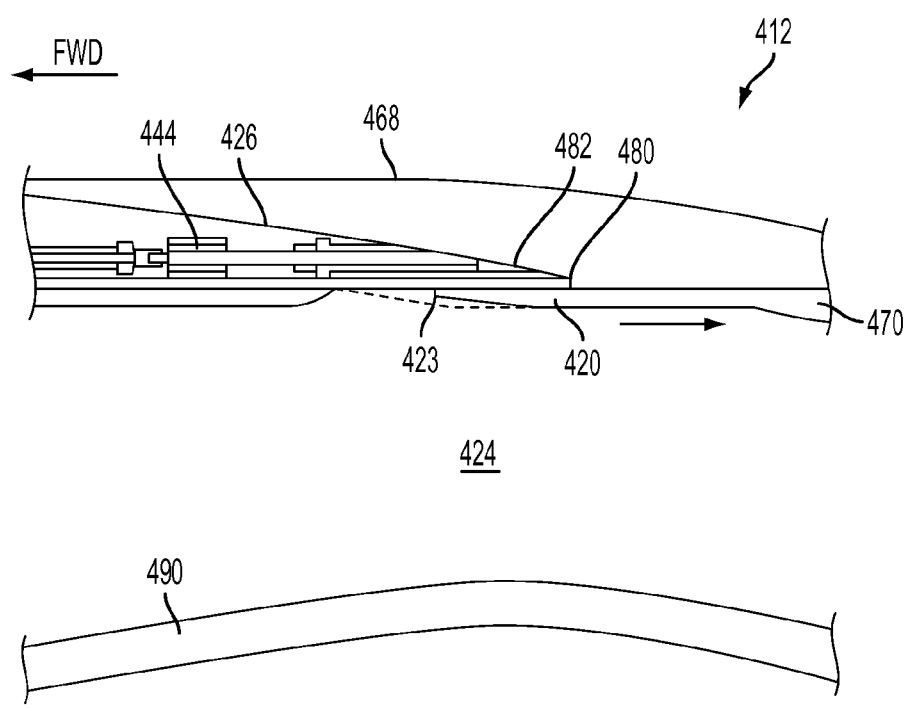
FIG. 16 is cross section of the variable area fan nozzle assembly shown in FIGS. 12-15 taken along line 16-16 in FIG. 14.

The nozzle segment 420 is shown in a deployed position in FIGS. 13, 14 and 16. In the deployed position, an upstream bypass flow exit 422 is formed between the trailing edge 415 of the nacelle portion 426 and a leading edge 423 of the nozzle segment 420. The end of the upstream bypass flow exit 422 is bounded by the edge 486 of the projection 482. The projection 482 serves to divert or deflect exiting bypass flow away from the beavertail split fairing 462 and away from components and structures that are covered by the fairing 462. Accordingly, the projection 482 substantially prevents discharged bypass flow from passing through and around the split beavertail fairing 462 as bypass flow is discharged through the upstream exit 422. As a result, noise and drag associated with discharged bypass flow in the proximity of the beavertail fairing 462 can be minimized, and engine performance can be enhanced. A projection 482 can be provided proximate to each end of each translating nozzle segment of the translating variable area nozzle assembly 412.

Figure 15:
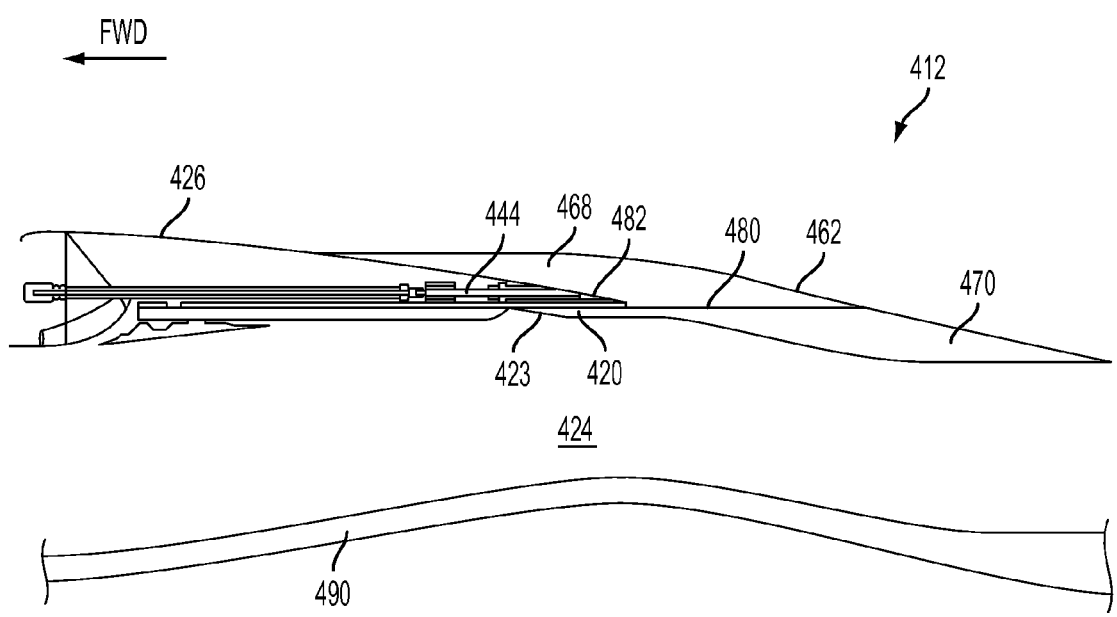
FIG. 15 is cross section of the variable area fan nozzle assembly shown in FIGS. 12-14 taken along line 15-15 in FIG. 12.

As shown in FIG. 14, the forward beavertail fairing portion 468 can cover portions of the guide structure 440 and an actuator 444 mounted adjacent to the guide structure 440, thereby shielding these components from external air flow when the nozzle segment 420 is in the stowed or deployed position. FIG. 15 shows the relationship of the nacelle portion 426, the forward beavertail fairing portion 468, the nozzle segment 420, and the aft beavertail fairing portion 470 when the nozzle segment 420 is in a stowed position. In this position, at least portions of the projection 482 and the forward beavertail fairing portion 468 overlap the surface 480 on the nozzle segment 420. In the stowed position shown in FIG. 15, the nacelle portion 426 and the nozzle segment 420 surround the core cowl 490, and form the bypass flow duct 424 therebetween. In FIG. 16, the nozzle segment 420 is shown in a deployed position, and the previously stowed position of the nozzle segment 420 is indicated by a dashed line. As shown in FIG. 16, at least a portion of the projection 482 can overlap the surface 480 on the nozzle segment 420 when the nozzle segment 420 is in the deployed position. The upstream exit 422 shown in FIGS. 13 and 14 is not visible in the cross sectional view shown in FIG. 16.

Figure 17:
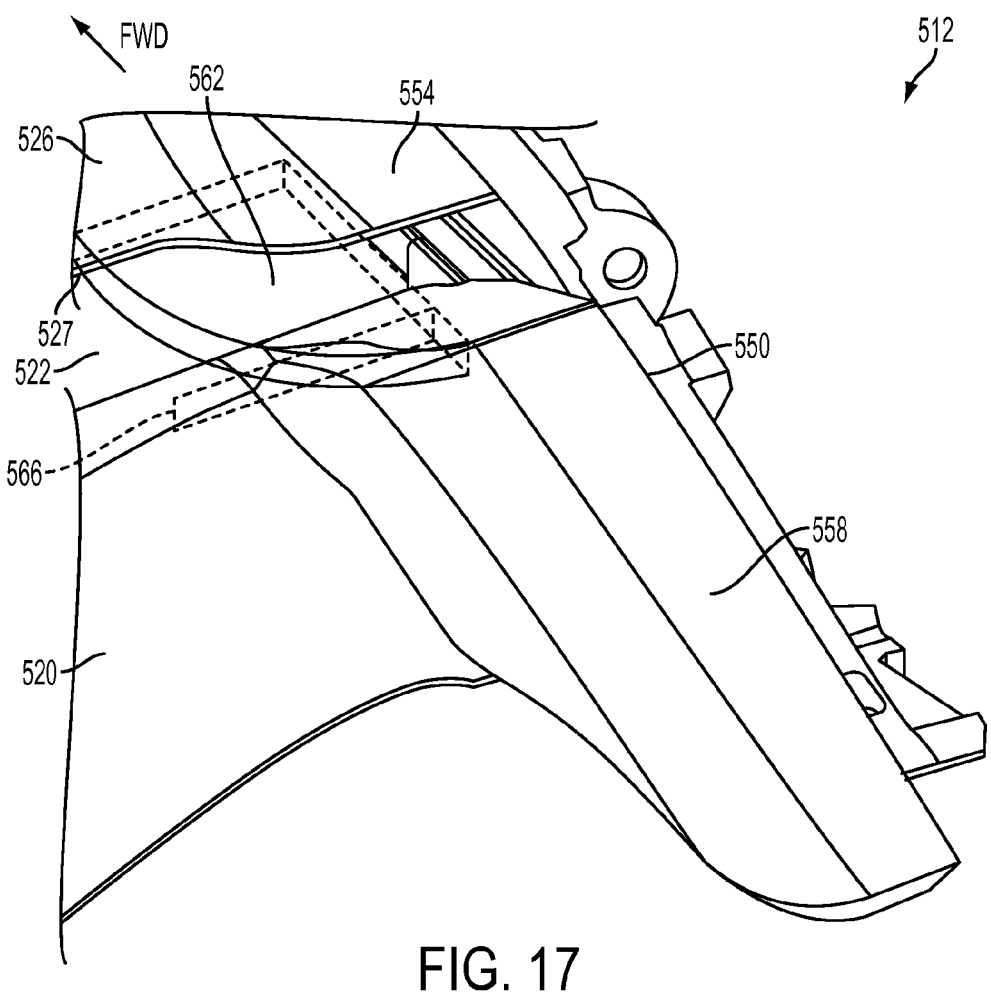
FIG. 17 is a perspective view of a portion of another embodiment of a variable area fan nozzle assembly according to the invention with a translating ring segment in a deployed position.
Figure 18:
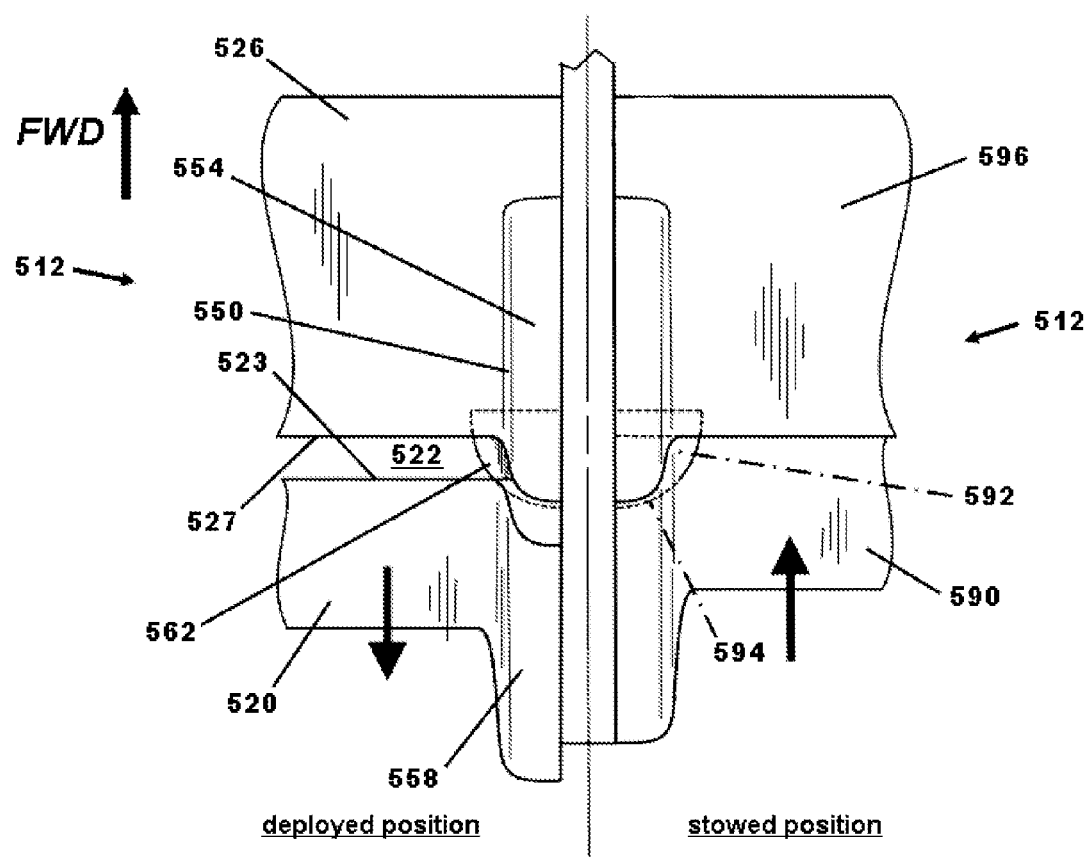
FIG. 18 is a top plan view of a portion of the variable area fan nozzle assembly shown in FIG. 17 showing translating ring segment in a deployed position on the left half side of the figure, and showing the translating ring segment in a stowed position on the right half side of the figure.

Another embodiment of a variable area nozzle assembly 512 is shown in FIGS. 17-18. Again, the nozzle assembly 512 includes at least one translating nozzle segment 520, and can be mounted aft of a nacelle portion 526 which can be either a thrust reverser sleeve or a stationary forward nacelle portion (as generally illustrated in FIG. 1 and FIGS. 9A and 9B, respectively). As shown in FIG. 18, the variable area nozzle assembly 512 can include a first nozzle segment 520 and an opposed second nozzle segment 590, and the second nozzle segment 590 can be a mirror image of the first nozzle segment 520. Though the first and second nozzle segments 520, 590 are normally both stowed or both deployed at any one time, in FIG. 18, the first nozzle segment 520 is shown in a deployed position on the left half side of the drawing, and the second nozzle segment 590 is shown in a stowed position on the right half side of the drawing for purposes of illustration only.

In the deployed position shown in FIG. 17 and on the left half side of FIG. 18, an upstream bypass flow exit 522 is formed between a leading edge 523 of the first nozzle segment 520 and an opposed trailing edge 527 of the nacelle portion 526. A split beavertail fairing 550 can be located at each end of the first translating nozzle segment 520 (only one end of the first translating nozzle segment 520 is shown in FIGS. 17-18). The split fairing 550 can include an upstream fairing portion 554 on the nacelle portion 526, and a downstream fairing portion 558 on the translating nozzle segment 520. Fore and aft translation of the translating nozzle segment 520 respectively closes and opens the upstream bypass flow exit 522. A second translating nozzle segment 590 is shown in a closed or stowed position on the right half side of FIG. 18, wherein a forward edge of the second nozzle segment 590 is proximate to a trailing edge of an adjacent nacelle portion 596.

As shown in FIGS. 17-18, the nacelle portion 526 can include a deflector 562 that rearwardly extends from its trailing edge 527. As shown in FIG. 17, the corresponding translating nozzle segment 520 can include an opposed void 566, such as a slot, a pocket, a recess, or the like for receiving portions of the deflector 562 as the translating nozzle segment 520 moves between its stowed and deployed positions. The void 566 can be sufficiently deep to receive the entire deflector 562 when the translating nozzle segment 520 is in its stowed position. For example, as shown on the right half side of FIG. 18, aft portions of a second deflector 592 are received in an aligned void 594 in the second translating nozzle segment 590 when the second nozzle segment 590 is in its stowed position.

As shown in FIG. 17, the deflector 562 occupies an area that otherwise would comprise an end portion of the upstream bypass flow exit 522 if the deflector 562 was absent. The deflector 562 substantially prevents discharged bypass flow from flowing through and around the split beavertail fairing 562 as the air is discharged from the upstream exit 522. As a result, noise and drag associated with discharged bypass flow in the proximity of the beavertail fairing 562 can be minimized, and engine performance can be enhanced. Deflector 562, 592 can be provided on both ends of both translating nozzle segments 520, 590.

Figure 19:
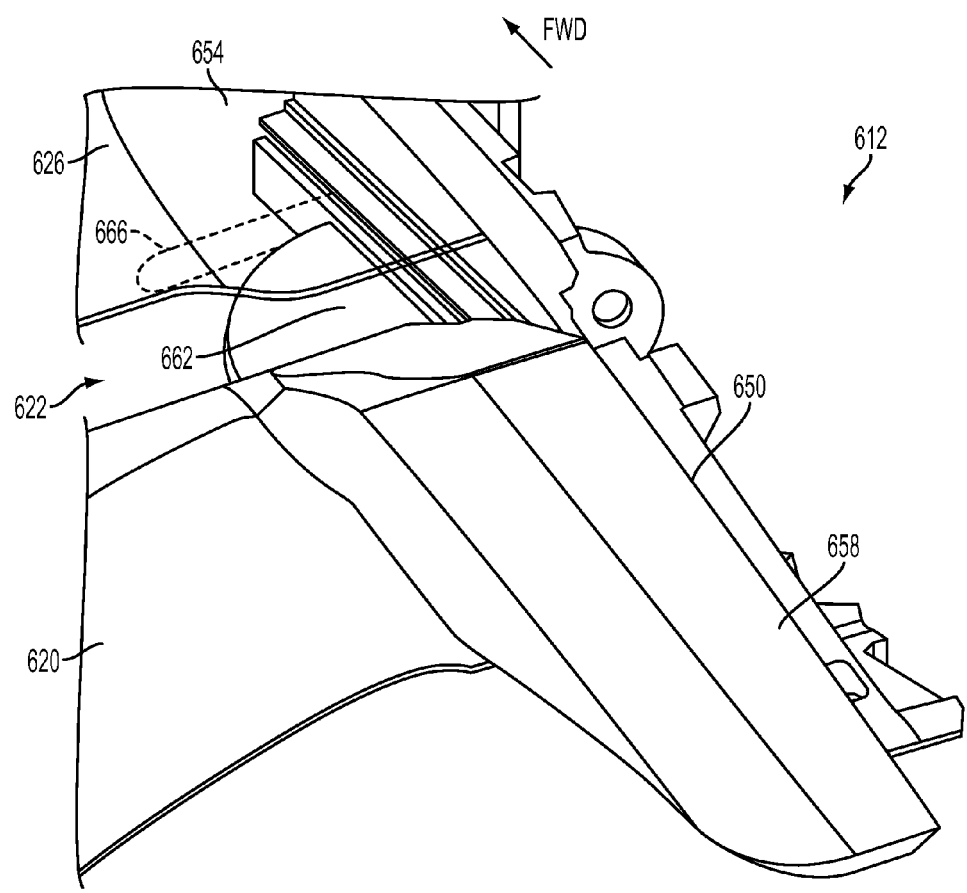
FIG. 19 is a perspective view of a portion of an additional embodiment of a variable area fan nozzle assembly according to the invention with a translating ring segment in a deployed position.

Another embodiment of a variable area nozzle assembly 612 is shown in FIGS. 19-20. This nozzle assembly 612 can be substantially similar to the nozzle assembly 512 discussed above and shown in FIGS. 17-18, except as described below.

As shown in FIG. 19, a translating nozzle segment 620 is movably disposed behind a trailing edge of a nacelle portion 626, and selectively opens and closes an upstream bypass flow exit 622. A split beavertail fairing 650 includes an upstream fairing portion 654 and a downstream fairing portion 658 disposed on respective opposed sides of the upstream exit 622. As shown in FIG. 20, the variable area nozzle assembly 612 can also include a second translating nozzle segment 690 (shown in a stowed position). In this embodiment, deflectors 662, 692 forwardly extend from the leading edges of the respective translating nozzle segments 620, 690. As shown in FIG. 19, opposing slots, pockets or recesses 666, 694 can be formed in the trailing edges of the thrust reverser sleeve/stationary forward nacelle portions 626, 696 to receive at least a portion of a respective deflector 662, 692 when the translating nozzle segments 620, 690 are in their deployed positions. As shown on the right half side of FIG. 20, a slot, pocket or recess 694 can receive all or substantially all of a corresponding deflector 692 when the translating nozzle segment 690 is in its stowed position. Like the rearwardly extending deflectors 562, 592 described above, the forwardly extending deflectors 662, 692 substantially prevent bypass flow from exiting the upstream exit 622 in the vicinity of the split beavertail fairings 650 and other adjacent structures, and thereby minimize noise and drag associated with discharged bypass flow in this region.

Persons of ordinary skill in the art will understand that while the invention has been described in terms of various embodiments and various aspects and features, certain modifications, variations, changes and additions can be made to the described embodiments without departing from the spirit and scope of the invention. For example, a deflector could be attached to another adjacent structure, such as to a stationary portion of a guide mechanism or other support member at a location forward of a translating nozzle section. Such a stationary deflector could be configured to block the exit of bypass flow proximate to an end of a translating nozzle segment like the deflectors 562, 592, 662, 692 described above, and could be received within a slot, pocket or recess of a leading edge of a corresponding translating nozzle segment when the nozzle segment is in a stowed position. All such modifications, variations, changes and additions are intended to be within the scope of the appended claims.

What is claimed is:

1. A nacelle assembly for a turbofan aircraft engine having a centerline, the nacelle comprising:
   (a) a forward nacelle portion having an outer fairing and a trailing edge;
   (b) a translatable variable area fan nozzle comprising at least one nozzle segment, the nozzle segment having a leading edge and a first end and being selectively movable between a stowed position and one or more deployed positions, wherein in the deployed positions, an upstream bypass flow exit is formed between the trailing edge and the leading edge and in at least the stowed position, the nozzle segment overlaps with the forward nacelle trailing edge;
   (c) a split beavertail fairing comprising an upstream fairing portion on the outer fairing of the forward nacelle portion and a downstream fairing portion on the first end of at least one nozzle segment, wherein when the nozzle segment is in the stowed position, the upstream fairing portion and the downstream fairing portion combine to form a substantially continuous outer surface extending between the forward nacelle portion and the at least one nozzle segment; and
   (d) a deflector located proximate to the first end of the at least one nozzle segment and adjacent the split beavertail fairing, wherein the deflector is configured to substantially block air flow that exits the nacelle assembly through the upstream bypass flow exit from contacting the split beavertail fairing when the nozzle segment is in the deployed position;
   wherein the deflector is affixed to the nacelle and rearwardly extends from the trailing edge;
   wherein at least a portion of the deflector overlaps a portion of the nozzle segment when the nozzle segment is in a fully deployed position of said one or more deployed positions.

2. A nacelle assembly according to claim 1 wherein the forward nacelle portion is a stationary forward cowl.

3. A nacelle assembly according to claim 1 wherein the forward nacelle portion is a translatable thrust reverser sleeve.

4. A nacelle assembly according to claim 1 wherein a gap is formed between the upstream fairing portion and the downstream fairing portion when the nozzle segment is in the one or more deployed positions, and wherein the deflector is configured to substantially block air flow that exits the nacelle assembly through the upstream bypass flow exit from passing through the gap when the nozzle segment is in the one or more deployed positions.

5. A variable area fan nozzle assembly for a turbofan engine assembly having a primary bypass flow exit for discharging engine bypass flow, the assembly comprising:
   (a) a forward nacelle portion having a trailing edge;
   (b) a translating nozzle segment having a leading edge and a first end;
   (c) support means for movably supporting the first end of the translating nozzle segment such that the nozzle segment is movable between a stowed position and a deployed position, wherein an upstream bypass flow exit is formed between the leading edge and the trailing edge when the nozzle segment is in the deployed position and in at least the stowed position, the nozzle segment overlaps with the forward nacelle trailing edge;
   (d) a fairing at least partially covering the support means; and
   (e) means for substantially preventing air from passing through the upstream bypass flow exit in a region proximate to the fairing;
   wherein the means for substantially preventing air from passing through the upstream bypass flow exit proximate to the fairing comprises a deflector adjacent to the fairing and attached to the forward nacelle portion and rearwardly extending from the trailing edge;
   wherein at least a portion of the deflector overlaps a portion of the nozzle segment when the nozzle segment is in the fully deployed position.

* * * * *